Oct. 17, 1967  E. S. BARNES  3,347,088
LENS MOUNTING ALIGNMENT APPARATUS AND METHOD
Filed Dec. 10, 1965

EDGAR S. BARNES
INVENTOR.

BY R. Frank Smith
David P. Ogden
ATTORNEYS

United States Patent Office 3,347,088
Patented Oct. 17, 1967

3,347,088
LENS MOUNTING ALIGNMENT APPARATUS AND METHOD
Edgar S. Barnes, Rochester, N.Y., assignor to Eastman Kodak Company, Rochester, N.Y., a corporation of New Jersey
Filed Dec. 10, 1965, Ser. No. 512,938
5 Claims. (Cl. 73—37.5)

The present invention relates to lens mounting alignment and more particularly to a lens mounting alignment apparatus and method that has combined therein an air gaging system for indicating accurately the centering of the lens during lens mounting.

Lens mounting devices utilizing mating axial cup clamp configurations are disclosed in Patents 2,259,006, Simmons, issued Oct. 14, 1941, and 2,304,984, Wood, issued Dec. 15, 1942. As taught in the prior art patents, these lens mounting devices may be pressed together and/or rotated about the lens axis to automatically position a lens. However, tools of this type can come to rest without properly centering a lens and may center a lens which is upside down or of an improper curvature.

Therefore, an object of the present invention is to provide an improved lens mounting apparatus and method having an air gaging device coupled thereto to determine the centering of a lens surface within tolerance limits.

In accordance with one embodiment of my invention, the addition of an air gage to the lens mounting clamp system of the prior art makes the system substantially foolproof. When using such a clamp to position and hold lenses prior to securing them in a lens system or holder, the added air gage provides signal information of the lens having a specific precalibrated centering with accuracies of the order of .0005" or better.

The subject matter which is regarded as my invention is particularly pointed out and distinctly claimed in the concluding portion of this specification. The invention, however, as to its organization and operation, together with further objects and advantages, will best be understood by reference to the following description taken in connection with the accompanying drawing, in which:

Figure 1:
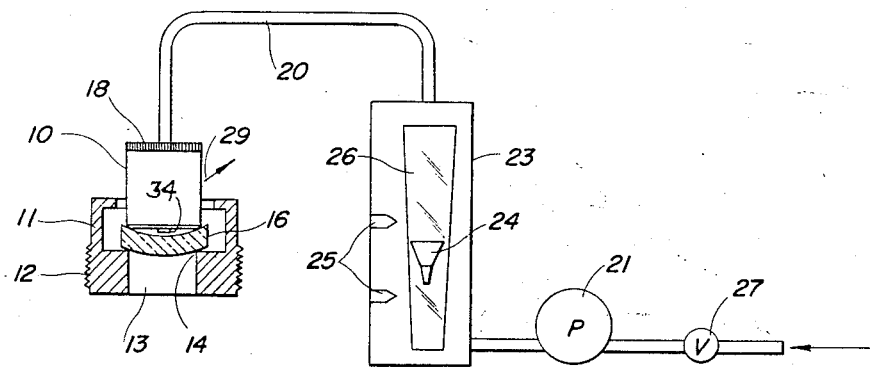
FIG. 1 is a diagrammatic view illustrating a representative overall construction of the present invention.

Referring now to the drawing wherein like numbers indicate similar parts, I have shown in FIG. 1 a cup centering clamping tool 10 for centering a lens in a lens fixture 11 having external focusing threading 12, a central aperture 13 and a co-operating circular clamping surface 14 whereby pressing a convex-concave lens 16 between the tool 10 and the surface 14 and rotating the tool about its axis, as by a gear 18, will cause the lens 16 to be centered. The lens 16 is formed in a relatively common lens shape wherein the two refracting faces are each surfaces of revolution about the optic axis of the lens. The curvature of each lens surface must result in a thinning or thickening of the lens material as the radius from the axis increases. However, because of lens molding techniques, it often occurs that the periphery of the lens body is not coaxial with the optic axis. As explained in greater detail in the above-mentioned patents, such a cup centering technique is extremely accurate, and when a lens is so centered, it may be secured accurately in the fixture 11 by glues or potting compounds.

However, cupping or more precisely centering by the method of cup tools pressed together will sometimes not be centered by simply applying pressure. Moreover, a lens with an improper refracting face curvature may be centered or the lens may be placed in the lens fixture upside down. In any of these cases, the resulting lens system will not meet its specifications.

In order to provide signal information of a proper lens centering, the tool 10 is made fluid conductive and receives gaging air through a conduit 20 from a pump 21. I prefer that the pump be stable at various flow rates. Between the tool 10 and pump 21 is an air flow gage 23 having a float 24 being air supported between calibrated limit pointers 25 on a central tube 26. The central tube 26 is tapered so that as the air flow rate increases slightly the float 24 will rise substantially therein. The float position is initially established by a calibrating air flow control valve 27 coupled in the air system. Thus, each tool 10 may be used with several lens curvatures within certain curvature limits.

As indicated in FIG. 1, air flows through the valve 27, the pump 21, the gage 23, the conduit 20 and the tool 10 finally to escape from the side thereof as indicated by an arrow 29. If the lens 16 is of proper curvature and orientation, the float 24 will reside between the limit pointers 25 when the system is properly regulated and the lens is properly centered. I have found that centering errors as small as .0005" may be detected with this air gage system when used with the clamping tool 10 of the present invention.

Figure 2:
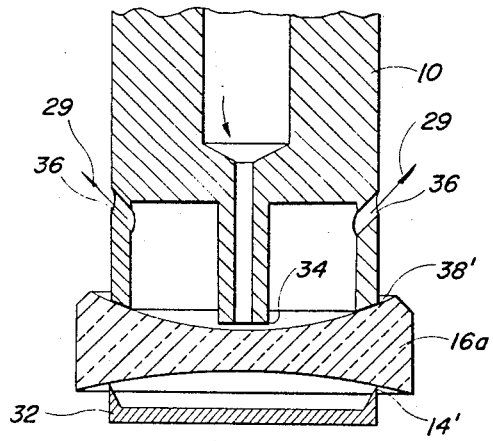
FIG. 2 is a cross-section elevation view of one lens mount cup utilizing the air gage of FIG. 1.

Referring now to FIG. 2, I have shown a proper gage and lens relationship. A lens 16a is shown as a convex-convex lens placed substantially symmetrically on a cup-shaped support member 32 having an upper clamping annular surface 14' equivalent to that indicated at 14 in FIG. 1. Next the air gage clamping tool 10 has been placed in a coaxial position over the lens 16a. When using such a support system, the lens 16a may be encased in an annular plastic ring having controlled peripheral dimensions for later assembly in a lens system. When setting the lens 16a in such a ring fixture, the support member 32 is removed prior to using the lens.

In accordance with the present invention, air is pumped through the center of the tool 10 to a gaging orifice surface region 34 which is spaced from the nearest surface of the lens 16a to provide a predetermined pressure drop for a certain volume of air flow therethrough. Air escapes as indicated by arrows 29 through unrestricted exhaust ports 36 from the chamber surrounding the oriffice 34. The particular lens 16a illustrated in FIG. 2 may be a prechecked reference lens used to establish the setting of the valve 27, or may be a production one that centers the float 24 between the limit pointers 25. Thus, the lens in FIG. 2 is a "good" lens and is centered.

Figure 3:
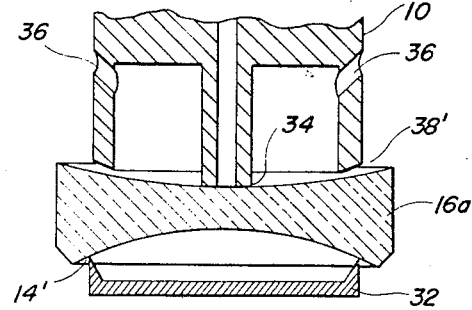
FIG. 3 illustrates the operation of the air gage and lens mount cup of FIG. 2 when the lens is upside down.

Referring now to FIG. 3, the lens 16a has been turned over whereby it is no longer possible to properly position it in the particular fixture for which it was designed. The lens 16a (of FIG. 3) could be centered by the member 32 and the tool 10 and might appear to a quality inspector of the incomplete lens system to be properly positioned. However, in fact, it would prevent the complete lens system from accomplishing its intended function within its design tolernaces. When the lens 16a is so positioned, the orifice 34 is no longer properly adjusted from the adjacent surface of the lens 16a. Thus, the air flow through the gage 23 (FIG. 1) will no longer provide a "good signal" and the float 24 will not come to rest between the limits 25.

Figure 4:
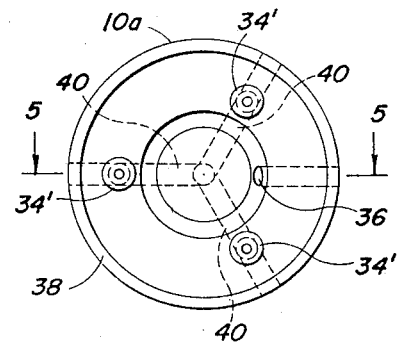
FIG. 4 is a plan view of a lens mount cup surface for engaging a large convex lens.

Obviously, the lens being positioned and gaged may be a large lens and/or may be convex-convex instead of convex-concave (FIG. 1) or concave-concave (FIG. 2). A tool 10a is shown in FIG. 4 for gaging the proper alignment of such a lens (16b of FIG. 5) and is provided with three gaging orifices 34' and one unrestricted exhaust port 36. It should be noted from the plan view of FIG. 4 that the outer circumference of the tool 10a has a peripheral flange 38 designed to engage fully the lens surface and to center the lens in accordance with the teaching of the above-mentioned patents. The entire periphery of this flange 38 is designed to engage the lens surface when the lens cup is centered. If the flange does not engage the lens, the lens is not centered and the air gage will so indicate.

The tool 10 of FIGS. 1, 2 and 3 has a similar outer flange 38' which is designed to support the gaging orifice 34 a preselected distance above the surface of the centered lens. Using such a controlled air flow system, a change of centering of as little as .0005 inch will provide an air gage detectable signal difference indicating that the curvature is not acceptable.

Figure 5:
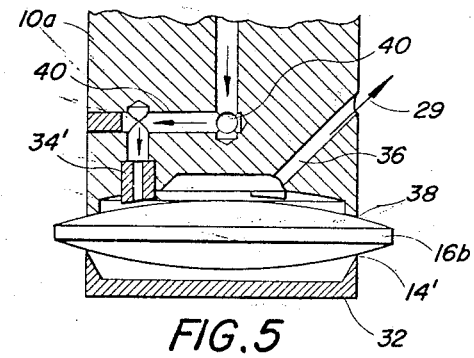
FIG. 5 is a cross-section view taken along line 5—5 of FIG. 4.

Referring now to FIG. 5, the lens 16b is shown with the tool 10a positioned thereover and the cup-shaped clamping support member 32 thereunder. As indicated in FIG. 5, each of the gaging orifices 34' may consist of a jewel having a precisely determined central orifice; this jewel being of a type sometimes used in watches. Each of these jewels or gaging orifices 34' is precisely shaped and spaced from the lens 16b. When the lens 16b is properly centered and is of proper curvature, the air gage 23 will so indicate. The tool 10a, of course, is provided with a plurality of air flow channels 40, whereby each of the gaging orifices 34' is receptive of air from the conduit 20 and the air gage 23.

While I have shown a particular embodiment of this invention, modifications thereof will occur to those skilled in this art. I intend therefore to have the appended claims cover such embodiments as properly fall within the scope of the present invention.

I claim:
1. A lens mounting apparatus for holding and gaging a lens whose refracting faces are surfaces of revolution about the optic axis of the lens, comprising:
   a cup-shaped member having a peripheral flange positionable to engage a peripheral portion of a surface of a lens face, when the lens is centered, said member and the lens surface defining a chamber and said member defining a gaging orifice inlet and an unrestricted exhaust port for the chamber, the orifice being directed toward and spaced from the lens surface in accordance with the curvature thereof for admitting air to the chamber with a predeterminable pressure drop during a certain rate of air flow;
   support means having a peripheral flange coaxial with said member flange and co-operating therewith to center the lens;
   a conduit means coupled to the gaging orifice in said member;
   pump means for pumping air through said conduit means to the gaging orifice; and
   an air flow gage coupled in said conduit means to provide a signal information indicative of the curvature of the lens surface adjacent to said member as the lens is centered by said member and said support means.
2. Lens mounting apparatus as in claim 1, including:
   a jewel member for accurately determining the opening of the gaging orifice and the spacing between it and the adjacent lens surface.
3. Lens mounting apparatus as in claim 1, including:
   valve means for regulating the flow of air to obtain said signal information within predetermined limits of air flow rate.
4. The method of air gaging an optically aligned lens having two refractive surfaces of revolution about the optic axis of the lens, comprising the steps of:
   placing the lens on a support clamp with one refractive surface substantially symmetrical with respect thereto;
   placing an air gaging cup clamp on the other refractive surface coaxial with said support clamp;
   exerting clamping pressure causing the lens to slip laterally until both clamp surfaces have a substantially uniform line contact with the lens, whereby a gaging orifice of said air gaging cup clamp assumes a position close to said other refractive surface;
   pumping fluid through said gaging orifice to develop signal information indicative of the flow rate; and
   comparing the flow rate with a norm to determine whether spacing between said other refractive surface and the gaging orifice is within predetermined tolerances.
5. The method of air gaging as in claim 4 including the additional step of regulating the air flow to calibrate the signal information derived within said predetermined tolerances.

References Cited

UNITED STATES PATENTS

| | | | |
|---|---|---|---|
| 1,151,635 | 8/1915 | Webb | 33—174 |
| 2,266,169 | 12/1941 | Crumrine | 350—178 |
| 2,403,897 | 7/1946 | Aller | 73—40 |
| 2,497,236 | 2/1950 | Polk | 73—37.5 |
| 2,625,061 | 1/1953 | Mansfield | 77—32 |
| 2,963,900 | 12/1960 | Kuebler | 73—37 |
| 2,969,670 | 1/1961 | Liebreich | 73—37.5 |

LOUIS R. PRINCE, *Primary Examiner.*

WILLIAM HENRY, II, *Assistant Examiner.*